United States Patent
Sato

(10) Patent No.: US 9,294,632 B2
(45) Date of Patent: Mar. 22, 2016

(54) MOBILE TERMINAL AND COMPUTER-READABLE RECORDING MEDIUM FOR A MOBILE TERMINAL USING NEAR FIELD WIRELESS COMMUNICATION TO TRANSMIT A SCAN COMMAND TO A SCANNING DEVICE

(71) Applicant: BROTHER KOGYO KABUSHIKI KAISHA, Nagoya, Aichi (JP)

(72) Inventor: Hirokazu Sato, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/501,732

(22) Filed: Sep. 30, 2014

(65) Prior Publication Data

US 2015/0116762 A1    Apr. 30, 2015

(30) Foreign Application Priority Data

Oct. 25, 2013    (JP) ................. 2013-221942

(51) Int. Cl.
*G06F 3/12*    (2006.01)
*H04N 1/00*    (2006.01)
(Continued)

(52) U.S. Cl.
CPC ....... *H04N 1/00103* (2013.01); *H04N 1/00244* (2013.01); *H04N 1/00315* (2013.01);
(Continued)

(58) Field of Classification Search
CPC ... G06F 3/1204; G06F 3/1236; G06F 3/1261; G06F 3/1288; G06F 3/1292; G06F 3/1293; H04N 1/00222; H04N 1/00225; H04N 1/00228; H04N 1/00244; H04N 1/00307; H04N 1/00342; H04N 1/32507; H04N 2201/0036; H04N 2201/0041; H04N 2201/0096; H04N 2201/3212; H04N 2201/3278; H04N 2201/006; H04N 2201/0055; H04N 2201/0094; H04W 4/008; H04M 1/7253; H04M 2250/04
USPC ............. 358/1.13, 1.15, 1.16, 1.14; 455/41.1, 455/41.2, 41.3
See application file for complete search history.

(56) References Cited

U.S. PATENT DOCUMENTS

| | | | |
|---|---|---|---|
| 7,986,418 B2 * | 7/2011 | Hoshino et al. | 455/556.1 |
| 2012/0147420 A1 * | 6/2012 | Nishimi et al. | 358/1.15 |
| 2013/0141760 A1 * | 6/2013 | Mori | 358/1.15 |
| 2013/0188212 A1 * | 7/2013 | Pardhan et al. | 358/1.15 |

(Continued)

FOREIGN PATENT DOCUMENTS

JP    2004-86731 A    3/2004

*Primary Examiner* — Benny Q Tieu
*Assistant Examiner* — Juan M Guillermety
(74) *Attorney, Agent, or Firm* — Scully, Scott, Murphy & Presser, PC

(57) ABSTRACT

A non-transitory computer-readable recording medium for a mobile terminal configured to communicate with first and second scanning devices which exist within a communicatable range of an NFC (near field wireless communication), the recording medium storing instructions which cause the mobile device to, when the NFC is established between the mobile terminal and a particular scanning device, which is one of the first and second scanning devices, transmit to the particular scanning device a scan command to instruct to generate scan data, execute a determination process to determine which of the first and second scanning devices is the particular scanning device, and only when the first scanning device is the particular scanning device, execute a first process to store the scan data in a first storage server which corresponds to the first scanning device, the scan data being generated in the particular scanner device based on the scan command.

17 Claims, 5 Drawing Sheets

(51) Int. Cl.
*H04W 4/00* (2009.01)
*H04N 1/21* (2006.01)

(52) U.S. Cl.
CPC ............ *H04N1/2166* (2013.01); *H04W 4/008* (2013.01); *H04N 2201/006* (2013.01); *H04N 2201/0074* (2013.01); *H04N 2201/0081* (2013.01); *H04N 2201/0094* (2013.01)

(56) References Cited

U.S. PATENT DOCUMENTS

2013/0235409 A1* 9/2013 Miyata .................... 358/1.13
2013/0258405 A1* 10/2013 Tsuya ..................... 358/1.15
2014/0185088 A1* 7/2014 Lee et al. ................ 358/1.15

\* cited by examiner

MOBILE TERMINAL AND COMPUTER-READABLE RECORDING MEDIUM FOR A MOBILE TERMINAL USING NEAR FIELD WIRELESS COMMUNICATION TO TRANSMIT A SCAN COMMAND TO A SCANNING DEVICE

CROSS-REFERENCE TO RELATED APPLICATION

This application claims priority under 35 U.S.C. §119 from Japanese Patent Application No. 2013-221942 filed on Oct. 25, 2013. The entire subject matter of the application is incorporated herein by reference.

BACKGROUND

1. Technical Field

The following disclosures relate to a mobile terminal configured to transmit a scan command to a scanning device, and a computer-readable recording medium storing instructions to be executed by a processor of such a mobile terminal.

2. Related Art

Recently, there is suggested a technique of transmitting scan data, which is generated by a scanning device, to a storage server and managing the scan data with the storage server.

SUMMARY

According to such a conventional technique, when the scan data is transmitted to the storage server, a destination storage server should be selected, or identified. Such an operation lowers operability. Further, when the user selects the destination storage server, the user may select a wrong destination storage server. In such a case, information may be leaked inadvertently.

The present disclosures is advantageous since there is provided a technique which improve the operability in transmitting the scan data to the storage server and also provides a technique of preventing the scan data from being transmitted to a wrong destination.

According to aspects of the disclosures, there is provided a non-transitory computer-readable recording medium for a mobile terminal provided with a processor and a near field wireless communication unit configured to execute a near field wireless communication, the mobile terminal being configured to communicate with a first scanning device and a second scanning device which exist within a communicatable range of the near field wireless communication, the recording medium storing instructions which, when executed by the processor, cause the mobile device to, when the near field wireless communication is established between the mobile terminal and a particular scanning device, which is one of the first scanning device and the second scanning device, transmit to the particular scanning device a scan command to instruct the particular scanning device to generate scan data, execute a determination process to determine which of the first scanning device and the second scanning device is the particular scanning device, and only when the first scanning device is the particular scanning device, execute a first process to store the scan data in a first storage server which corresponds to the first scanning device, the scan data being generated in the particular scanner device based on the scan command.

According to further aspects of the disclosures, there is provided a mobile terminal, which is provided with a near field wireless communication unit configured to communicate with one of a first scanning device and a second scanning device which exist within a communicatable range of the near field wireless communication unit, and a processor. The processor is configured to, when the near field wireless communication is established between the mobile terminal and a particular scanning device, which is one of the first scanning device and the second scanning device, transmit to the particular scanning device a scan command to instruct the particular scanning device to generate scan data, execute a determination process to determine which of the first scanning device and the second scanning device is the particular scanning device, and only when the first scanning device is the particular scanning device, execute a first process to store the scan data in a first storage server which corresponds to the first scanning device, the scan data being generated in the particular scanner device based on the scan command.

According to further aspects of the disclosures, there is provided a communication method for a mobile terminal provided with a processor and a near field wireless communication unit configured to execute a near field wireless communication, the mobile terminal being configured to communicate with a first scanning device and a second scanning device which exist within a communicatable range of the near field wireless communication. The communication method has, when the near field wireless communication is established between the mobile terminal and a particular scanning device, which is one of the first scanning device and the second scanning device, transmitting to the particular scanning device a scan command to instruct the particular scanning device to generate scan data, executing a determination process to determine which of the first scanning device and the second scanning device is the particular scanning device, and only when the first scanning device is the particular scanning device, executing a first process to store the scan data in a first storage server which corresponds to the first scanning device, the scan data being generated in the particular scanner device based on the scan command.

BRIEF DESCRIPTION OF THE ACCOMPANYING DRAWINGS

DETAILED DESCRIPTION OF THE ILLUSTRATIVE EMBODIMENTS

<First Illustrative Embodiment>

Figure 1:
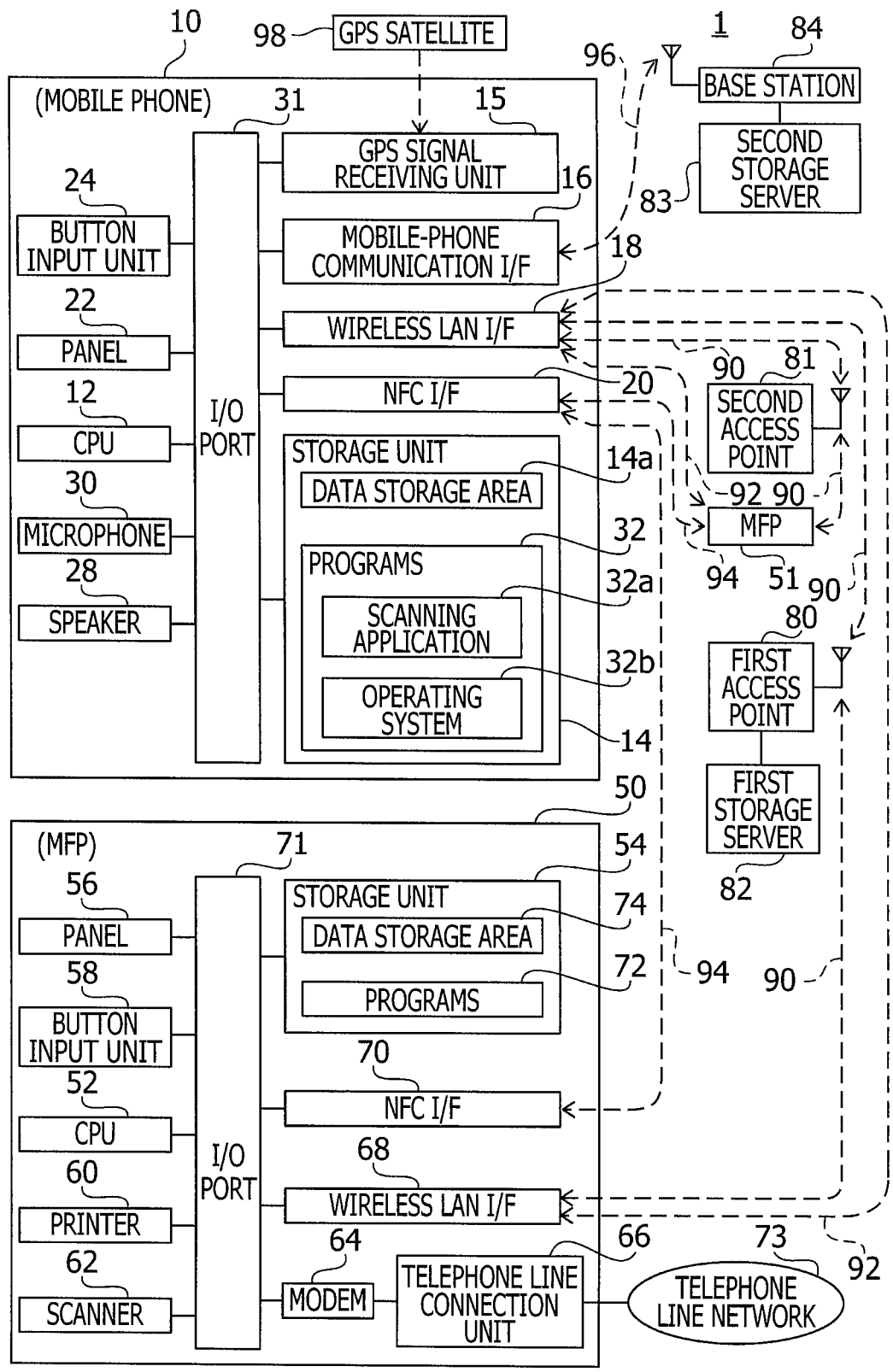
FIG. 1 is a block diagram of a communication system according to aspects of the disclosures.

A communication system 1 shown in FIG. 1 includes a mobile-phone 10, an MFP 50, which is an abbreviation for a multifunction peripheral, another MFP 51, a first access point 80, a second access point 81, a first storage server 82, a second storage server 83, and a base station 84. The mobile-phone 10 and the MFPs 50 and 51 has a function of a terminal device for a wireless LAN, which is an abbreviation for a local area network. Further, each of the MFPs 50 and 51 is a peripheral device having a plurality of functions such as a printer function, a scanner function, a copier function and a facsimile function. Each of the first access point 80 and second access point 81 has a function of a wireless LAN access point. Each of the first storage server 82 and the second storage server 83 serves as a server storing various pieces of data. According to the illustrative embodiment, the first storage server 82 is connected to the first access point 80, and configured to store data transmitted from external devices via the first access point 80. The second storage server 83 is connected to the base station 84, and is configured to store data transmitted from external devices via the base station 84.

According to the illustrative embodiment, the MFP 50 and the first access point 80 are proved in a company office, and the first storage server 82 connected to the first access point 80 is managed by the company. The MFP 51 and the second access point 81 are provided at a user's home. The second storage server 83 is typically on a network and provided by a providing company.

The mobile-phone 10 typically has a CPU 12, which is an abbreviation for a central processing unit, a storage unit 14, a GPS signal receiving unit 15, a mobile-phone communication I/F 16, a wireless LAN I/F 18, an NFC I/F 20, a panel 22, a button input unit 24, a speaker 28 and a microphone 30. The above components are connected via an input/output port 31 such that they communicate with each other.

The wireless LAN I/F 18 is configured to execute a Wi-Fi type wireless communication 90 (hereinafter, occasionally referred to as a WF wireless communication) in accordance with the standard 802.11 of the IEEE. It is noted that Wi-Fi® is a register trademark of Wi-Fi Alliance, and IEEE is an abbreviation for Institute of Electrical and Electronics, or ones in relation to the same. When the mobile-phone 10 accesses the first access point 80 and becomes in a condition to use the WF wireless communication 90, the mobile-phone 10 is in a condition for executing data communication with the MFP 50 via the first access point 80. When the mobile-phone 10 accesses the second access point 81 and becomes in a condition to use the WF wireless communication 90, the mobile-phone 10 is in a condition for executing the data communication with the MFP 51 via the second access point 81. Since the first storage server 82 is connected to the first access point 80, when the mobile-phone 10 becomes in a condition for using the WF wireless communication 90, the mobile-phone 10 is capable of executing data communication with the first storage server 82 via the first access point 80.

The wireless LAN I/F 18 is capable of executing a wireless communication 92, which is a Wi-Fi direct type wireless communication (hereinafter, also referred to as a WFD wireless communication) based on the IEEE 802.11 standard or one related thereto. That is, when the mobile-phone 10 accesses the access point the MFP 50 has and becomes in condition for executing the WFD wireless communication 92, the mobile-phone 10 is capable of executing data communication directly with the MFP 50. When the mobile-phone 10 accesses the access point the MFP 51 has and becomes in condition for executing the WFD wireless communication 92, the mobile-phone 10 is capable of executing the data communication directly with the MFP 51.

The NFC I/F 20 is configured to execute a wireless communication 94 in accordance with a standard ISO/IEC 21481 or ISO/IEC 18092, ISO being an abbreviation for International Organization for Standardization, and IEC being an abbreviation for International Electrotechnical Commission.

When the mobile-phone 10 is in condition for executing the NFC wireless communication 94, the mobile-phone 10 can execute data communication directly with the MFP 50 or the MFP 51. However, in comparison with the WF wireless communication 90 or the WFD wireless communication 92, the communicatable distance is relatively short, and the communication speed is slow in the NFC wireless communication 94.

The mobile-phone I/F 16 is configured to execute a wireless communication 96 according to a mobile-phone communication method with the base station 84. That is, when the mobile-phone 10 is in condition for executing the wireless communication 96 according to the mobile-phone communication method, the mobile-phone 10 is capable of execute the data communication with the second storage server 83 via the base station 84.

The CPU 12 executes processes in accordance with programs 32 stored in the storage unit 14. In the following description, however, instead of the CPU 12 executing a program, a name of the program being executed may occasionally be referred to for brevity. For example, instead of stating that the CPU 12 execute a step of a scanning application 32a, it would occasionally be stated that the scanning application 32a executes a step. Incidentally, the storage unit 14 has a RAM which is an abbreviation for a random access memory, a ROM which is an abbreviation for a read only memory, a flash memory, an HDD which is an abbreviation for a hard disk drive, and a buffer provided to the CPU 12, which are sued individually or in combination.

The storage unit 14 stores a program 32, which includes a scanning application 32a, an operating system OS 32b. The scanning application 32a controls the CPU 12 to execute a scan process by the MFP 50 or MFP 51. The storage unit 14 may be a non-transitory computer-readable storage medium, such as the ROM, the RAM, the flash memory, and the hard disk. It is noted that electrical signals carrying programs downloaded form a server on the Internet should not be regarded as the non-transitory medium.

The operating system 32b, which will also be referred to as the OS 32b, is a program which provides various basic functions used in the scanning application 32a. The OS 32b includes programs which execute the wireless communications 90, 92 and 94 via the mobile-phone I/F 16, a wireless LAN I/F 17, the wireless LAN I/F 18, and the NFC I/F 20, and programs controlling the storage unit 14, the panel 22, and the button input unit 24.

Further, the storage unit 14 includes a data storage area 14a. The data storage area 14a is used to store various pieces of data including a plurality of pieces of photograph data for executing the scanning application 32a. The scanning application 32a outputs data, via the OS 32b, to store various pieces of data in the data storage area 14a. Alternatively, the scanning application 32a retrieves various pieces of data stored in the data storage area 14a via the OS 32b.

The GPS signal receiving unit 15 receives signals from GPS satellites 98. The OS 32b calculates a position of the mobile-phone 10 based on the signals received from the GPS satellites 98. The scanning application 32a obtains, via the OS 32b, data related to the position of the mobile-phone 10 as calculated.

The panel 22 has a display screen which displays various functions of the mobile-phone 10. The scanning application 32a outputs image data for display, and displays an image represented by the image data on the panel 22 via the OS 32b.

The button input unit 24 has a touch sensor which is formed integrally with the panel 22. The touch sensor detects approaching and contacting of an input medium with respect to the panel 22, thereby acquiring a user operation of buttons. The scanning application 32a obtains data representing user operation of the buttons via the OS 32b.

Next, the configuration of the MFP 50 and the MFP 51 will be described. Since the MFPs 50 and 51 have substantially the same configurations, only the MFP 50 will be described. The MFP 50 generally has a CPU 52, a storage unit 54, a panel 56, a button input unit 58, a printer 60, a scanner 62, a modem 64, a telephone network connection unit 66, a wireless LAN IT 68 and an NFC IT 70. These components are interconnected though an I/O port 71 so that they can communicate with each other.

The wireless LAN IT 68 executes the WF wireless communication 90 in accordance with the IEEE 802.11 standard and/or one following the same. Similarly, the wireless LAN IT 68 executes the WFD wireless communication 92 in accordance with the IEEE 802.11 standard and/or one following the same. The NFC I/F 70 executes the NFC wireless communication 94 in accordance with the ISO/IEC 21481 or ISO/IEC 18092.

The CPU 52 executes various processes based on the program 72 stored in the storage unit 54. In the following description, the CPU 52 executing a program will occasionally be referred to simply by the name of the program. For example, instead of reciting "the CPU 52 which is executing a program," the description may simply recited "A program."

The storage unit 54 has a data storage area 74, which is an area used to store various pieces of data when operations of the printer 60, the scanner 62 and the like are controlled.

The panel 56 has a display screen which displays various functions of the MFP 50. The button input unit 58 has a touch sensor which is formed integrally with the panel 56. The touch sensor of the button input unit 58 detects approaching and contact of the input medium with respect to the panel 56 so as to acquire user operation of the buttons.

The printer 60 executes a printing operation. The scanner 62 executes a scanning operation. The modem 64 has a function of modulating image data to be transmitted with its facsimile function to signals which can be transmitted through the telephone network 72 and transmits the same through the telephone network connection unit 66. The modem 64 also has a function of demodulating the signal received through the telephone network 72 and the telephone network connection unit 66 to regenerate the original data.

Throughout the specification the terms "data" and "information" are used in accordance with the following definitions. That is, in the specification, the term "information" is used to have broader concept than the term "data." Therefore, "data A" could also be referred to as "information A." Further, even if there are plurality of pieces of "data" having different formats (e.g., a text format, a binary format, a flag format and the like), they are treated as the same "information" as long as the plurality of pieces of "data" represent the same content. For example, text-format data "COPY=2" representing that the number of copies to be printed is two and binary-format data "10" are treated as the same "information."

<Scanning Process by MFP Using Mobile-Phone>

According to the communication system 1, by putting the mobile-phone 10 over the MFP 50 or MFP 51, the scan process by the MFP 50 or MFP 51 can be initiated, respectively. Specifically, when the mobile-phone 10 is put over the MFP 50 or MFP 51, the NFC wireless communication 94 is established, and the scan process using the NFC wireless communication is executed. Then, the scan data generated by the scan process is stored in the first storage server 82, the second storage server 83 or the mobile-phone 10. The scan data is transmitted/received using the WF wireless communication 90 or the WFD wireless communication 92.

A method of putting the mobile-phone 10 over the MFP 50 to cause the MFP 50 to execute the scan process and a method of putting the mobile-phone 10 over the MFP 51 to cause the MFP 51 to execute the scan process are the same, the former will be described.

Firstly, the user puts the mobile-phone 10 over the NFC I/F 70 of the MFP 50. As the mobile-phone 10 approaches the MFP 50 and a distance between the mobile-phone 10 and the MFP 50 falls within a communicatable range of the NFC wireless communication 94, an initial communication sequence process is executed between the mobile-phone 10 and the MFP 50, and the NFC wireless communication 94 is established.

When the NFC wireless communication 94 is established, connection information for establishing the WF wireless communication 90 or the WFD wireless communication 92 is exchanged between the mobile-phone 10 and the MFP 50. It is noted that, with the WF wireless communication 90 and the WFD wireless communication 92, exchange of data can be executed faster than the NFC type wireless communication 94, and thus it is preferable to use the WF wireless communication 90 or the WFD wireless communication 92 to transmit/receive the scan data. It is noted that a switching of the wireless communication to the WF wireless communication 90 or the WFD wireless communication 92 using the NFC wireless communication 94 is referred to as a handover process.

Hereinafter, the handover process will be described. As connection information for establishing the WF wireless communication 90 or the WFD wireless communication 92, for example, an SSID, which is an abbreviation for Service Set Identifier, is known. When the SSID is used, the SSID is exchanged between the mobile-phone 10 and the MFP 50 using the NFC wireless communication 94. That is, when the NFC wireless communication 94 is established, an SSID using the wireless LAN I/F 18 of the mobile-phone 10 is transmitted from the mobile-phone 10 to the MFP 50 using the NFC wireless communication 94.

When the SSID of the mobile-phone 10 is the same as the SSID of the MFP 50, the SSID and IP address of the MFP 50 is transmitted from the MFP 10 to the mobile-phone 10 using the NFC wireless communication 94. Then, the WF wireless communication 90 or the WFD wireless communication 92 is established between the mobile-phone 10 and the MFP 50. When the SSID of the mobile-phone 10 and the SSID of the MFP 50 are different, the SSID to be used to access the access point of the MFP 50 and establish the WFD wireless communication 92 and a password are transmitted from the MFP 50 to the mobile-phone 10 using the NFC type wireless communication 94. Then, the mobile-phone 10 establish the WFD wireless communication 92 with the MFP 50 based on the SSID of the MFP 50.

When the WFD wireless communication 92 or the WFD wireless communication 90 is established between the mobile-phone and the MFP 50, the mobile-phone 10 transmits an execution command to execute the scan process using the wireless communication 92 or the WFD wireless communication 90 to the MFP 50. Upon receipt of the execution command from the mobile-phone 10, the MFP 50 starts the scan process using the scanner 62. When the scan process is completed in the MFP 50, the scan data generated in the scan process is transmitted from the MFP 50 to the mobile-phone 10 using the wireless communication 92 or the WFD wireless communication 90. When the scan data is received from the MFP 50, the mobile-phone 10 stores the scan data in the data storage area 14*a*.

As described above, simply by putting the mobile-phone 10 over the MFP 50, it is possible to cause the MFP 50 to execute the scan process. Further, the scan data generated in the scan process is transmitted from the MFP 50 to the mobile-phone 10. When the mobile-phone 10 is put over the MFP 51, the MFP 51 executes the scan process and transmits the scan data to the mobile-phone 10. It is noted that the MFP 50 is provided in the company office. Therefore, it is preferable to manage the scan data generated in the scan process executed by the MFP 50 with keeping the security thereof. Accordingly, the scan data generated in the scan process executed by the MFP 50 is stored in the first storage server 82 which is managed in the company. In contrast, the MFP 51 is proved at the user's home, and the user is allowed to arbitrarily manage the scan data generated in the scan process executed by the MFP 51. Accordingly, the scan data generated in the scan process executed by the MFP 51 may be stores in the second storage server 83 which is an on-line storage server provided by a service provided and/or in the data storage area 14*a* of the mobile-phone 10.

<Scan Data Generated in Company Office>

The scan data generated in the company office, that is, the scan data generated in the scan process executed by the MFP 50 is transmitted from the mobile-phone 10 to the first storage server 82, and stored and managed therein. Therefore, it is necessary that the mobile-phone 10 communicates with the first storage server 82 using a URL, which is an abbreviation for a Uniform Resource Locator, of the first storage server 82. However, in view of the security, the URL of the first storage server 82 is not stored in the mobile-phone 10. Therefore, it is necessary that the mobile-phone 10 obtains the URL of the first storage server 82 from the MFP 50.

Specifically, the mobile-phone 10 transmits, using the WFD wireless communication 92 or the WF wireless communication 90, a request to transmit the URL of the first storage server 82 to the MFP 50 after receipt of the scan data from the MFP 50 using the WFD wireless communication 92 or the WF wireless communication 90. The MFP 50 stores the URL of the first storage server 82, and transmits the URL of the first storage server 82 to the mobile-phone 10 in response to the request to transmit the same upon when the MFP 50 received such a request from the mobile-phone 10.

In contrast, the MFP 51 does not store the URL of the first storage server 82. Therefore, the MFP 51 does not transmit the URL of the first storage server 82 to the mobile-phone 10 even if the transmission request is received from the mobile-phone 10. With the above configuration, the mobile-phone 10 obtains the URL of the first storage server 82 when executing the WFD wireless communication 92 or the WF wireless communication 90 with the MFP 50, but does not obtain the URL of the first storage server 82 when executing the WFD wireless communication 92 or the WF wireless communication 90 with the MFP 51.

When the mobile-phone 10 obtains the URL of the first storage server 82, the mobile-phone 10 once stores the URL in the data storage area 14*a*. Then, using the URL, the mobile-phone 10 establishes the connection with the first storage server 82, and transmits the scan data to the first storage server 82 via the first access point 80 using the WF wireless communication 90. As above, the scan data generated in the company office, that is, the scan data generated in the scan process executed by the MFP 50 is stored and managed in the first storage server 82. It is noted that, when the scan data has been transmitted to the first storage server 82, the scan data stored in the data storage area 14*a* is deleted. Accordingly, the security of the scan data can be protected. Further, the URL of the first storage server 82 is also deleted from the data storage area. Therefore, the security of the URL of the first storage server 82 is also protected.

<Management of Scan Data Generated in User's Home>

The scan data generated in the user's home, that is the scan data generated in the scan process executed by the MFP 51 is stored and managed in the second storage server 83 or the mobile-phone 10. Specifically, in the mobile-phone 10, when the scan data is received from the MFP 51, a selection screen encouraging the user to select the second storage server 83 or the mobile-phone 10 in which the scan data is to be stored is displayed on the panel 22 of the mobile-phone 10.

If the user selects the second storage server 83 for storing the scan data, the scan data is transmitted from the mobile-phone 10 to the second storage server 83, and stored therein. Specifically, the data storage area 14*a* stores the URL of the second storage server 83, and the mobile-phone 10 establishes a connection with the second storage server 83 using the URL of the second storage server 83. Then, the mobile-phone 10 transmits the scan data, using the mobile-phone wireless communication 96, to the second storage server 83 via the base station 84. With this configuration, the scan data generated at the user's home, that is the scan data generated in the scan process executed by the MFP 51 is stored and managed in the second storage server 83.

<Determination of Origin of Scan Data>

In the mobile-phone 10, the destination storage is determined based on whether the obtained scan data is generated by the MFP 50 or the MFP 51. Therefore, it is necessary that the mobile-phone 10 determines by which of the MFP 50 and MFP 51 the scan data has been generated. According to the illustrative embodiment, the mobile-phone 10 determines which of the MFP 50 and MFP 51 generated the scan data in accordance with one of the three methods respectively using the position information of the mobile-phone 10, the SSID used when WFD wireless communication 92 or the WF wireless communication 90 was established, and whether the URL of the first storage server 82 exists or not.

Firstly, a determination method using the position information of the mobile-phone 10 will be described. As described above, the mobile-phone 10 has the GPS signal receiving unit 15 configured to receive the signals from the GPS satellites 98. With use of the GPS signal, the mobile-phone 10 is capable of obtaining the position information of the mobile-phone 10. According to this method, the mobile-phone 10 obtains the position information of the mobile-phone 10 when the scan data was received. In the data storage area 14*a*, the position information of the company office, and the position information of the user's home. Therefore, by comparing the position information when the scan data was received with the position information of the company office and the position information of the user's home, the mobile-phone 10 can determine which of the MFP 50 and the MFP 51 generated the scan data. Specifically, when the position information of the mobile-phone 10 and the position information of the company office are close to each other, it is determined that the obtained scan data was generated by the MFP 50, and when the position information of the mobile-phone 10 and the position information of the user's home are close to each other, it is determined that the obtained scan data was generated by the MFP 51.

Next, a method using the SSID will be described. The mobile-phone 10 obtains the SSID from the MFP 50 or MFP 51 in order to establish the WF wireless communication 90 or the WFD wireless communication 92. Each device has intrinsic SSID, and the SSID of the MFP 51 and the SSID of the MFP 50 are different. Therefore, by referring to the SSID which was used when the wireless communication was established, it is possible to determine whether the obtained scan data was generated by the MFP 50 or the MFP 51.

Next, the method using the URL of the first storage server 82 will be described. As described above, in the mobile-phone 10, the URL of the first storage server 82 is not usually stored. Only when the scan data is transmitted to the first storage server 82, the URL of the first storage server 82 is temporarily obtained from the first storage server 82. That is, when the URL of the first storage server 82 is stored in the mobile-phone 10, it is determined that the obtained scan data was generated by the MFP 50, and when the URL of the first storage server 82 is not stored in the mobile-phone 10, it is determined that the obtained scan data was generated by the MFP 51.

As described above, in the mobile-phone 10, the device that generated the scan data was automatically determined, and the scan data is stored in a storage corresponding to the device that generated the scan data. With this configuration, it is unnecessary for the user to select the storage in which the scan data is to be stored, and the scan data is appropriately stored in the storage where the scan data is to be stored. Therefore, with this configuration, the operability of the mobile-phone 10 is improved. Further, with this configuration, an erroneous user selection of the storage for the scan data, and the securing of the scan data can be well protected. In particular, the scan data generated at the company office is automatically transmitted to the first storage server 82 when the mobile-phone 10 receives the scan data, thereby security of the data being highly protected. In contrast, when the scan data is generated at the user's home, the scan data is stored in the second storage server 83 or the mobile-phone 10 in accordance with the user's choice, which improves the user's operability.

<Scanning Application>

The above-described scan process and management of the scan data are carried out as the scanning application 32a is executed by the CPU 12 of the mobile-phone 10. Hereinafter, referring to FIGS. 2 and 3, a control flow for causing the MFP 50 of MFP 51 to execute the scan process, and for managing the scan data in accordance with the device (i.e., the MFP 50 or the MFP 51) which executed the scan process will be described.

Figure 2:
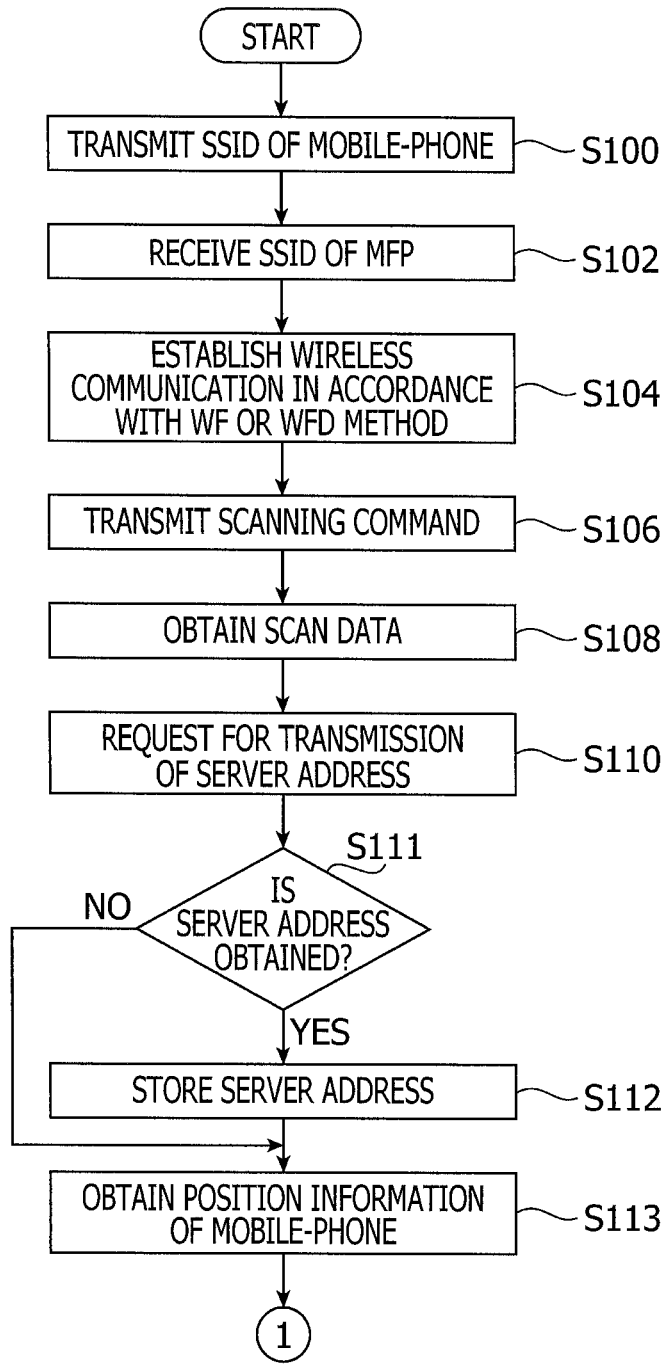
FIGS. 2 and 3 show a flowchart illustrating an operation of a mobile-phone according to a first embodiment of aspects of the disclosures.
Figure 3:
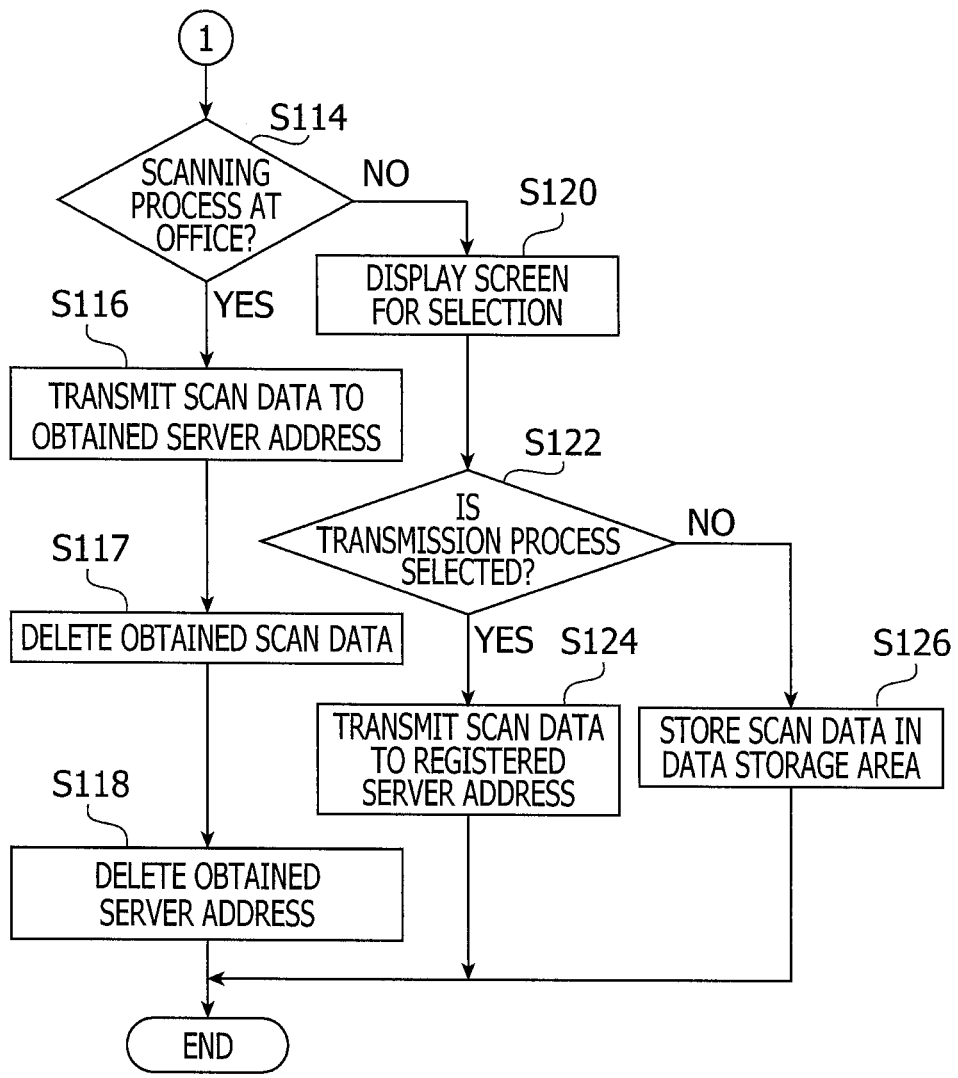

When the mobile-phone 10 is moved close to the MFP 50 or MFP 51, and the NFC wireless communication is established, a process shown in FIGS. 2 and 3 is executed. In S100, the CPU 12 outputs, via the OS 32b, data to transmit the SSID of the mobile-phone 10 to the MFP 50 using the NFC wireless communication, as described in a section of <Scan Process by MFP using Mobile-Phone>. Then, in S102, the CPU 12 obtains the SSID of the MFP 50 transmitted from the MFP 50 or MFP 51 using the NFC wireless communication 94. Then, the process proceeds to S104.

In S104, the CPU 12 outputs data, via the OS 32b, for establishing the WF wireless communication 90 of the WFD wireless communication 92 with the MFP 51. Then, in S106, the CPU 12 outputs, via the OS 32b, data for transmitting an execution command of the scan process using the WF wireless communication 90 or the WFD wireless communication 92. Thereafter, the process proceeds to S108.

In S108, the CPU 12 obtains, via the OS 32b, the scan data transmitted from the MFP 50 or the MFP 51 using the WF wireless communication 90 or the WFD wireless communication 92. Then, the CPU 1 outputs, via the OS 32b, data for storing the obtained scan data in the data storage area 14a. Then, the process proceeds to S110. In S110, the CPU 12 outputs, via the OS 32b, data for transmitting a request to transmit the URL of the first storage server 82 to the mobile-phone 10 to the MFP 50 or the MFP 51 using the WF wireless communication 90 or the WFD wireless communication 92. Then, the process proceeds to S111.

In S111, the CPU 12 determines whether the mobile-phone 10 has obtained the URL of the first storage server 82. When the URL of the first storage server 82 has been obtained (S111: YES), the process proceeds to S112. In S112, the CPU 12 outputs, via the OS 32b, data for storing the obtained URL of the first storage server 82 in the data storage area 14a. Thereafter, the process proceeds to S113. When the CPU 12 has not obtained the URL of the first storage server 82 (S111: NO), the process proceeds to S113, skipping S112.

In S113, the CPU 12 obtains the position information of the mobile-phone 10 via the OS 32b. Then, in S114, the CPU 12 determines whether the obtained scan data is data that was generated in the company office as described in a section of <Determination of Origin of Obtained Scan Data>. Specifically, when a position based on the position information of the mobile-phone 10 obtained in S112 and the position based on the position information of the company stored in the data storage area 14a are close to each other, it is determined that the obtained scan data was generated in the company office. Alternatively, when the SSID obtained in S102 coincides with the SSID of the MFP 50 stored in the data storage area 14a, it is determined that the obtained scan data is data that was generated in the company office. Further alternatively, when the URL of the first storage server 92 has been received in response to the transmission request transmitted in S110, it is determined that the scan data was generated in the company office.

When the obtained scan data was generated in the company office (S114: YES), the process proceeds to S116. In S116, the CPU 12 outputs, via the OS 32b, data for connecting the mobile-phone 10 with the first storage server 82 using the obtained URL of the first storage server 82. When the mobile-phone 10 is connected to the first storage server 82, the CPU 12 outputs, via OS 32b, data for transmitting the scan data to the first storage server 82 using the WF wireless communication 90. Then, in S117, the CPU 12 outputs, via the OS 32, data for deleting the scan data stored in the data storage area 14a. In S118, the CPU 12 output, via the OS 32b, data for storing the URL of the first storage server 82 stored in the data storage area 14a. Then, the scanning application 32a is terminated.

When the obtained scan data is data that was generated at the user's home (S114: NO), the process proceeds to S120. In S120, the CPU 12 outputs, via the OS 32b, data for displaying a screen encouraging the user to select whether to store the scan data in the second storage server 83 or the mobile-phone 10 on the panel 22. In S122, the CPU 12 determines whether the user selects the second storage server 83 to which the scan data is to be transmitted.

When the user has selected the second storage server 83 to which the scan data is to be transmitted (122: YES), the process proceeds to S124. In S124, the CPU 12 outputs, via the OS 32b, data for connecting the mobile-phone 10 to the second storage server 83 using the URL of the second storage server 83 which is stored in the data storage area 14a. When the mobile-phone 10 is connected to the second storage server 83, the CPU 12 outputs, via the OS 32b, data for transmitting the scan data to the second storage server 83 using the mobile-phone wireless communication 96. Thereafter, the scanning application 32 is terminated.

When the user has selected to sore the scan data in the mobile-phone 10 (S122: NO), the process proceeds to S126. In S126, the CPU 12 outputs, via the OS 32b, data for storing the scan data in the data storage area 14a. Thereafter, the scanning application is terminated.

<Second Illustrative Embodiment>

Hereinafter, a communication system according to a second illustrative embodiment will be described. It is noted that the hardware configuration of the second illustrative embodiment is similar to that of the first embodiment, and therefore, description of the hardware configuration of the second embodiment will not be repeated for brevity.

According to the first illustrative embodiment, the scan data generated in the company office, that is, the scan data generated by the MFP 50 is transmitted from the MFP 50 to the mobile-phone 10, and then transmitted from the mobile-phone 10 to the first storage server 82. In the communication system 1 according to the second illustrative embodiment, the scan data is transmitted from the MFP 50 to the first storage server 82.

Specifically, as the mobile-phone 10 is moved close to the MFP 50, the scan process using the NFC wireless communication 94 is executed by the MFP 50. In this case, the mobile-phone 10 transmits a command to transmit the scan data generated in the scan process to the first storage server 82 to the MFP 50 using the WF wireless communication 90 or the WFD wireless communication 92. The MFP 50 stores the URL of the first storage server 82, and connects with the first storage server 82 using the stored URL of the first storage server 82 upon receipt of the command to transmit from the mobile-phone 10. Then, the MFP 50 transmits the scan data to the first storage server 82 using the WF wireless communication 90. That is, according to the second illustrative embodiment, the scan data is transmitted from the MFP 50 to the first storage server 82 without routing through the mobile-phone 10. With this configuration, there is no possibility that the scan data generated in the company office remains stored in devices other than the MFP 50 such as the MFP 51, the mobile-phone 10 that is very likely to be connected with the second storage server 83, and the scan data is managed in the first storage server 82, the security is well protected.

According to the second illustrative embodiment, the mobile-phone 10 does not transmits the scan data to the first storage server 82, it is unnecessary for the mobile-phone to store the URL of the first storage server 82. That is, the mobile-phone 10 never obtains the URL of the first storage server. Therefore, according to the second illustrative embodiment, which of the MFP 50 and the MFP 51 generated the scan data is determined based on the position information of the mobile-phone 10, or the SSID used when the WF wireless communication 90 or the WFD wireless communication 92 was established.

It is noted that the scan data generated at the user's home, that is the scan data generated by the MFP 51 is, in accordance with the user's choice, stored and managed in the second storage server 83 or the mobile-phone 10 similar to the first embodiment.

Figure 4:
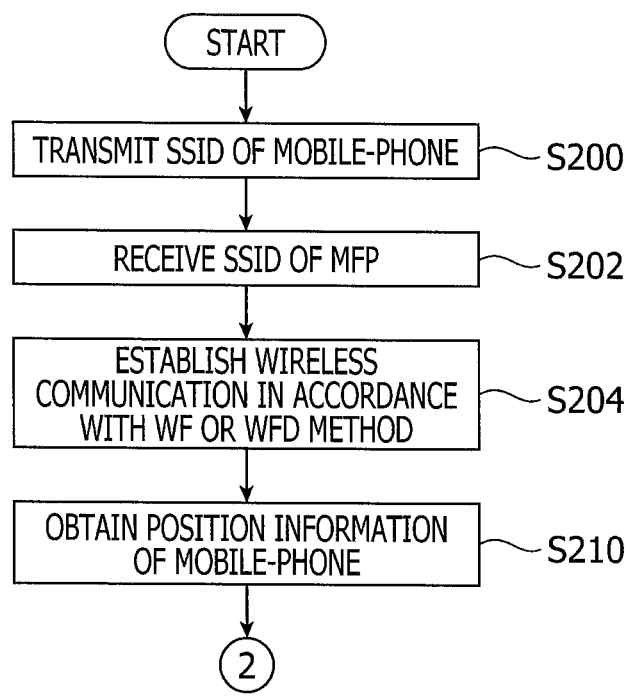
FIGS. 4 and 5 show a flowchart illustrating an operation of a mobile-phone according to a second embodiment of aspects of the disclosures.
Figure 5:
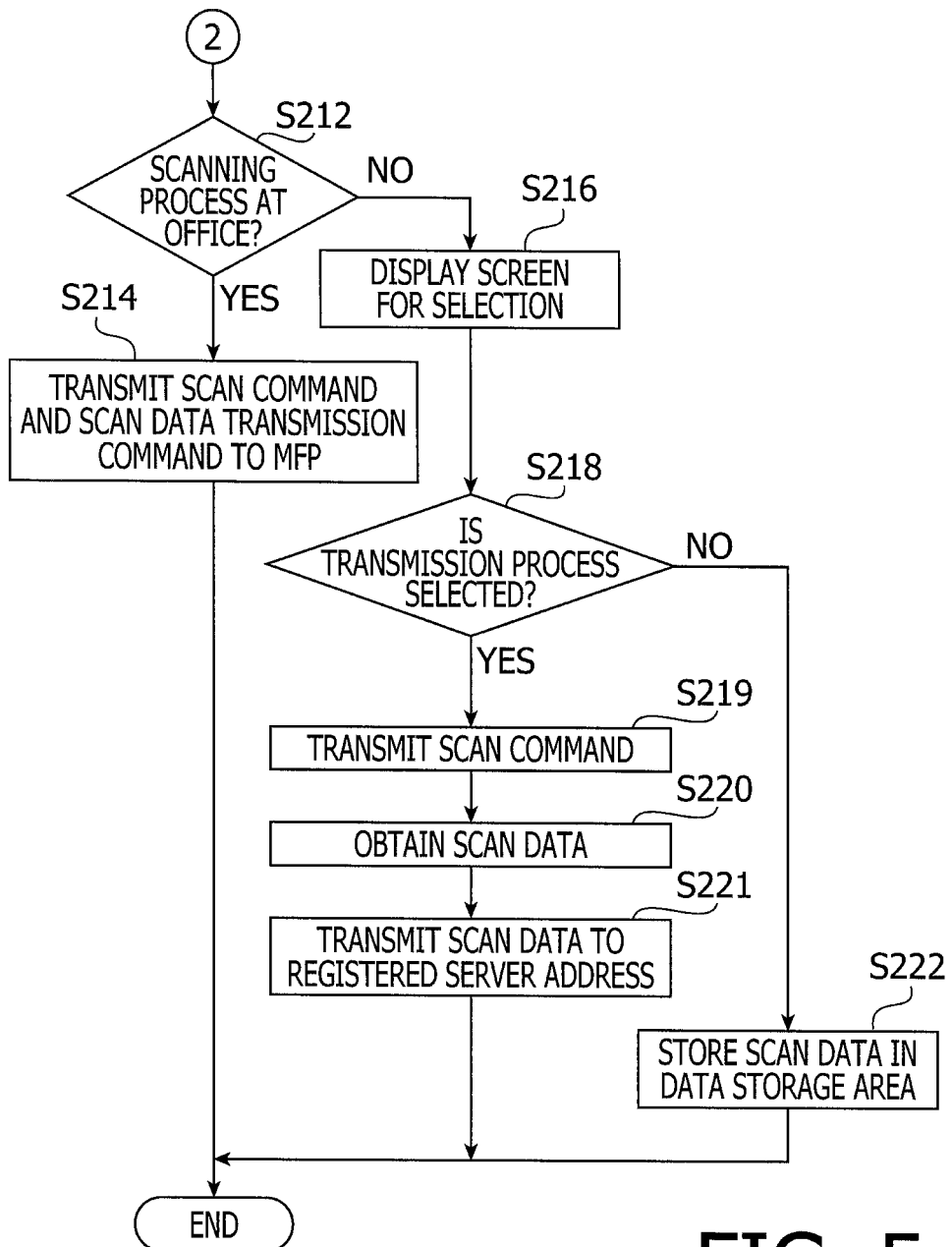

The scan process and management of the scan data are illustrated in a flowchart shown in FIGS. 4 and 5, which is executed by the CPU 12. It is noted that there common steps between the flowchart shown in FIGS. 2 and 3 and the flowchart shown in FIGS. 4 and 5, and description regarding the common portion will be simplified for brevity.

When the mobile-phone 10 is located close to the MFP 50 or MFP 51 and the NFC wireless communication 94 is established, the process illustrated in the flowchart shown in FIGS. 4 and 5 is initiated. In S200-S210, the CPU 12 executes steps similar to those of S100-S104 and S113 of the flowchart shown in FIG. 2. Thereafter, the process proceeds to S212. In S212, the CPU 12 determines whether the scan data was generated in the company office or not.

Specifically, when the position based on the position information of the mobile-phone 10 obtained in S210 and the position based on the position information of the company stored in the data storage area 14*a* are close to each other, it is determined that the scan data was generated in the company office. Alternatively, when the SSID obtained in S202 and the SSID of the MFP 50 stored in the data storage area 14*a* coincide with each other, it is determined that the scan data was generated in the company office.

When the scan data was generated in the company office (S212: YES), the process proceeds to S214. In S214, the CPU 12 outputs, via the OS 32*b*, data for transmitting a command to execute the scan process and a command to transmit the scan data to the first storage server 82 to the MFP 50 using the WF wireless communication 90 or the WFD wireless communication 92. Thereafter, the process shown in FIGS. 4 and 5 is terminated.

When the scan data was generated at the user's home (S212: NO), the process proceeds to S216. In S216, S218 and S222, the CPU 12 executes steps similar to S120, S122 and S126 of the flowchart shown in FIG. 3. When the transmission process is selected (S218: YES), the process proceeds to S219. In S219, the CPU 12 outputs, via the OS 32*b*, data for transmitting a command to execute the scan process to the MFP 51 using the WF wireless communication 90 or the WFD wireless communication 92. Then, in S220, the CPU 12 obtains, via the OS 32*b*, the scan data transmitted from the MFP 50 or the MFP 51 using the WF wireless communication 90 or the WFD wireless communication 92, and outputs, via the OS 32*b*, data for storing the obtained scan data in the data storage area 14*a*. Then, the process proceeds to S221. In S221, the CPU 12 executes the step similar to S124 of the flowchart shown in FIG. 3. Thereafter, the process illustrated in the flowchart shown in FIGS. 4 and 5 is terminated.

<Modifications>

According to the illustrative embodiments, the scan data generated in the company office is stored in the first storage server 82 which is managed in the company. This configuration may be modified such that the scan data generated in the company office may be stored in the storage server 83 which is an online storage provided by a service provider.

According to the illustrative embodiments, the command to execute the scan process is transmitted using the WF wireless communication 90 or the WFD wireless communication 92. This configuration may be modified such that the command to execute the scan process is transmitted using the NFC wireless communication 94.

According to the illustrative embodiments, the URL of the first storage server 82 is once stored in the data storage area 14*a*, and deleted thereafter. This configuration may be modified such that the area storing the URL is set to be an area in which no effective data is stored, and which area is allowed to be overwritten with other data.

It is noted that the mobile terminal that transmits the scan command to the MFP 50 needs not be limited to the mobile-phone, but can be other devices such as a tablet device, a smartphone and the like.

Further, the device which executes the scan process in accordance with the scan command from the mobile-phone 10 needs not be limited to the MFP 50 or the MFP 51, but any device which has a scanning function can be used.

According to the illustrative embodiments, as a near-distance wireless communication, the NFC wireless communication is employed. The invention needs not be limited to such a configuration, and TransferJet® (registered trademark for Sony Corporation) may be employed. In this case, as a wireless communication which is established with the handover process, various methods of the wireless communication of which transmission speed is higher than that of the TransferJet® may be employed. Further, optionally or alternatively, as a wireless communication which is established with the handover process, various methods of the wireless communication of which communication range is longer than that of the TransferJet® may be employed.

According to the illustrative embodiments, the CPU 12 of mobile-phone 10 executes processes based on the printing application 32a. However, the invention needs not be limited to such a configuration. For example, the CPU 12, which operates based on the printing application 32a, may be configured to causes the OS 32b, other systems, hardware components to execute various operations/processes.

In the illustrative embodiments, by executing the scanning application 32a, the flowchart shown in FIGS. 2 and 3 may be executed. It is noted that in the flowchart shown in FIGS. 2 and 3, S100-S104, S108-S112, S117-S126 may be skipped. Similarly, in the flowchart shown in FIGS. 4 and 5, S200-S210, S216-S222 may be skipped. It is note that in the above steps, all the steps may be skipped, or arbitrary steps may be remained/omitted.

The technical components as described/depicted exhibit technical usefulness individually or in any suitable combinations, which should not be limited the configurations at the time of filing the application. Further, the technical components as described/depicted could achieve a plurality of technical effects, but the technical components should be considered to have the technical usefulness if at least one of such technical effects is achieved.

It is noted that each program may include a single program module or a plurality of program modules. Any mutually exchangeable components/modules may be exchanged, and such a modification is also within a scope of the present disclosures. Computers may include one (i.e., CPU 12) which executes processes based on the programs (e.g., the printing application 32a). Alternatively or optionally, the computers may include ones which executes processes based on programs/applications other than the printing application 32a. The computer may include hardware (e.g., panel 22) which operates in accordance with instructions issued by the computer and/or combination of the computer and hardware which operate in an associated manner. The computer may execute a plurality of programs, and execute processes in an associated manner.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on non-transitory computer-readable media including but not limited to RAMs, ROMs, flash memories, EEPROMs, CD-media, DVD-media, temporary storages, hard disk drives, floppy drives, permanent storages, and the like. Further, the storage of the programs may include storages of a server which is connectable to the mobile-phone 10 or the MFPs 50 and 51 through a communication network. Further, the programs stored in the storage of such a server may be distributed as information and/or signals representing the programs through the communication network such as the Internet.

What is claimed is:

1. A non-transitory computer-readable recording medium for a mobile terminal provided with a processor and a near field wireless communication unit configured to execute a near field wireless communication, the mobile terminal being configured to communicate with a first scanning device and a second scanning device which exist within a communicable range of the near field wireless communication, the recording medium storing instructions which, when executed by the processor, cause the mobile device to:

when the near field wireless communication is established between the mobile terminal and a particular scanning device, which is one of the first scanning device and the second scanning device:
transmit to the particular scanning device a scan command to instruct the particular scanning device to generate scan data;
execute a determination process to determine which of the first scanning device and the second scanning device is the particular scanning device; and
only when the first scanning device is the particular scanning device, execute a first process to store the scan data in a first storage server which corresponds to the first scanning device, the scan data being generated in the particular scanner device based on the scan command,
wherein the mobile terminal stores transmission information necessary for transmitting the scan data to a second storage server, before the near field wireless communication is established between the mobile terminal and the particular scanning device;
wherein the instructions further cause the processor, when the particular scanner device is the second scanning device, to execute at least one of a second process and a third process;
wherein the second process includes processes:
to receive the scan data from the second scanning device and store the received scan data in a storage unit of the mobile terminal, and
to transmit the scan data stored in the storage unit to the second storage server; and
the third process is a process to receive the scan data from the second scanning device and store the received scan data in the storage unit of the mobile terminal.

2. The recording medium according to claim 1, wherein the first process is to store the scan data in the first storage server by transmitting to the first scanner device a transmission command instructing transmission of the scan data to the first storage server.

3. The recording medium according to claim 1, wherein the first process includes processes:
to receive the scan data from the first scanning device and store the received scan data in the storage unit of the mobile terminal;
to transmit the scan data stored in the storage unit to the first storage server; and
to invalidate the scan data stored in the storage unit after the scan data is transmitted to the first storage server.

4. The recording medium according to claim 3, wherein, when the near field wireless communication is established between the mobile terminal and the particular scanning device, the instructions further cause the processor to transmit a first request to the particular scanning device for transmitting transmission information necessary for transmitting the scan data to the first storage server, and
wherein the determination process includes processes:
to determine whether the transmission information is received in reply to the first request;

to determine the first scanning device is the particular scanning device when the transmission information is received in reply to the first request; and to determine the second scanning device is the particular scanning device when the transmission information is not received in reply to the first request.

5. The recording medium according to claim 4, wherein the instruction further cause the processor to:

when the transmission information is received in reply to the first request, store the received transmission information in the storage unit of the mobile terminal; and wherein the first process includes a process to invalidate the transmission information stored in the storage unit of the mobile terminal, after the scan data received from the scanning device is transmitted, by using the transmission information stored in the storage unit of the mobile terminal, to the first storage server.

6. The recording medium according to claim 1, wherein the mobile terminal comprises a position obtaining unit configured to receive signals from satellites and obtains a position of the mobile terminal based on the received signals, wherein the mobile terminal stores at least one of first position information and second position information, the first position information indicating a position of the first scanning device, the second position information indicating a position of the second scanning device, and wherein the determination process includes at least one of:

to determine the first scanning device is the particular scanning device if current position of the mobile terminal is approximate to the position of the first scanning device when the near field wireless communication is established with respect to the particular scanning device; and to determine the first scanning device is the particular scanning device if current position of the mobile terminal is not approximate to the position of the second scanning device when the near field wireless communication is established with respect to the particular scanning device.

7. The recording medium according to claim 1, wherein the mobile terminal comprises a long distance communication unit configured to execute a long distance communication, a communicable range of the long distance communication is greater than a communication range of the near field wireless communication;

wherein the mobile terminal stores at least one of first identification information and second identification information, the first identification information being used for communication between the mobile terminal and the first scanning device by the long distance wireless communication, the second identification information being used for communication between the mobile terminal and the second scanning device by the long distance wireless communication, wherein the determination process includes processes:

to obtain particular identification information which is necessary to communicate with the particular scanning device by the long distance communication;

to determine the first scanning device is the particular scanning device if at least one of that the first identification information is identical or equivalent to the particular identification information, and that the second identification information is not identical to or is not equivalent to the particular identification information; and to determine the second scanning device is the particular scanning device if at least one of that the second identification information is identical or equivalent to the particular identification information, and that the first identification information is not identical to or is not equivalent to the particular identification information.

8. The recording medium according to claim 1, wherein the mobile terminal comprises a display unit, wherein the instruction further cause the processor to output selection screen information to display a selection screen on the display unit when the second scanning device is determined to be the particular scanner device, the selection screen for selecting one of the second process and the third process, wherein the selection screen information is not output when the particular scanner device is the first scanning device, and wherein the processor executes selected one of the second process and the third process after the selection screen is displayed.

9. A mobile terminal, comprising:

a near field wireless communication unit configured to communicate with one of a first scanning device and a second scanning device which exist within a communicable range of the near field wireless communication unit;

a processor, wherein the processor is configured to:

when the near field wireless communication is established between the mobile terminal and a particular scanning device, which is one of the first scanning device and the second scanning device:

transmit to the particular scanning device a scan command to instruct the particular scanning device to generate scan data;

execute a determination process to determine which of the first scanning device and the second scanning device is the particular scanning device; and only when the first scanning device is the particular scanning device, execute a first process to store the scan data in a first storage server which corresponds to the first scanning device, the scan data being generated in the particular scanner device based on the scan command, wherein the mobile terminal stores transmission information necessary for transmitting the scan data to a second storage server, before the near field wireless communication is established between the mobile terminal and the particular scanning device;

wherein the processor is further configured to:

when the particular scanner device is the second scanning device, execute at least one of a second process and a third process:

to receive the scan data from the second scanning device and store the received scan data in a storage unit of the mobile terminal, and to transmit the scan data stored in the storage unit to the second storage server; and wherein the third process is a process to receive the scan data from the second scanning device and store the received scan data in the storage unit of the mobile terminal.

10. The mobile terminal according to claim 9, wherein the first process is to store the scan data in the first storage server by transmitting to the first scanner device a transmission command instructing transmission of the scan data to the first storage server.

11. The mobile terminal according to claim 9,
wherein the processor includes processes:
to receive the scan data from the first scanning device and store the received scan data in the storage unit of the mobile terminal;
to transmit the scan data stored in the storage unit to the first storage server; and
to invalidate the scan data stored in the storage unit after the scan data is transmitted to the first storage server.

12. The mobile terminal according to claim 11,
wherein, when the near field wireless communication is established between the mobile terminal and the particular scanning device, the processor is further configured to transmit a first request to the particular scanning device for transmitting transmission information necessary for transmitting the scan data to the first storage server, and
wherein the processor is further configured to:
determine whether the transmission information is received in reply to the first request;
determine the first scanning device is the particular scanning device when the transmission information is received in reply to the first request; and
determine the second scanning device is the particular device when the transmission information is not received in reply to the first request.

13. The mobile terminal according to claim 12,
wherein the processor is further configured to:
when the transmission information is received in reply to the first request, store the received transmission information in the storage unit of the mobile terminal; and
wherein the first process includes a process to invalidate the transmission information stored in the storage unit of the mobile terminal, after the scan data received from the scanning device is transmitted, by using the transmission information stored in the storage unit of the mobile terminal, to the first storage server.

14. The mobile terminal according to claim 9,
wherein the mobile terminal comprises a position obtaining unit configured to receive signals from satellites and obtains a position of the mobile terminal based on the received signals, and
wherein the mobile terminal stores at least one of first position information and second position information, the first position information indicating a position of the first scanning device, the second position information indicating a position of the second scanning device, and
wherein the determination process includes at least one of:
to determine the first scanning device is the particular scanning device if current position of the mobile terminal is approximate to the position of the first scanning device when the near field wireless communication is established with respect to the particular scanning device; and
to determine the first scanning device is the particular scanning device if current position of the mobile terminal is not approximate to the position of the second scanning device when the near field wireless communication is established with respect to the particular scanning device.

15. The mobile terminal according to claim 9,
wherein the mobile terminal comprises a long distance communication unit configured to execute a long distance communication, a communicable range of the long distance communication is greater than a communication range of the near field wireless communication,
wherein the mobile terminal stores at least one of first identification information and second identification information, the first identification information being used for communication between the mobile terminal and the first scanning device by the long distance wireless communication, the second identification information being used for communication between the mobile terminal and the second scanning device by the long distance wireless communication,
wherein the determination process includes processes:
wherein the processor is further configured to:
obtain particular identification information which is necessary to communicate with the particular scanning device by the long distance communication; and
determine the first scanning device is the particular scanning device if at least one of that the first identification information is identical or equivalent to the particular identification information, and that the second identification information is not identical to or is not equivalent to the particular identification information; and
determine the second scanning device is the particular scanning device if at least one of that the second identification information is identical or equivalent to the particular identification information, and that the first identification information is not identical to or is not equivalent to the particular identification information.

16. The mobile terminal according to claim 9,
wherein the mobile terminal comprises a display unit,
wherein the processor is further configured to output selection screen information to display a selection screen on the display unit when the second scanning device is determined to be the particular scanner device, the selection screen for selecting one of the second process and the third process,
wherein the selection screen information is not output when the particular scanner device is the first scanning device, and
wherein the processor executes selected one of the second process and the third process after the selection screen is displayed.

17. A communication method for a mobile terminal provided with a processor and a near field wireless communication unit configured to execute a near field wireless communication, the mobile terminal being configured to communicate with a first scanning device and a second scanning device which exist within a communicable range of the near field wireless communication, the communication method comprises:
when the near field wireless communication is established between the mobile terminal and a particular scanning device, which is one of the first scanning device and the second scanning device:
transmitting to the particular scanning device a scan command to instruct the particular scanning device to generate scan data;
executing a determination process to determine which of the first scanning device and the second scanning device is the particular scanning device; and
only when the first scanning device is the particular scanning device, executing a first process to store the scan data in a first storage server which corresponds to the first scanning device, the scan data being generated in the particular scanner device based on the scan command, storing transmission information necessary for transmitting the scan data to a second storage server, before the near field wireless communication is established between the mobile terminal and the particular scanning device;

when the particular scanner device is the second scanning device, executing at least one of a second process and a third process;

wherein the second process includes:
    receiving the scan data from the second scanning device and store the received scan data in a storage unit of the mobile terminal, and
    transmitting the scan data stored in the storage unit to the second storage server; and the third process is a process for receiving the scan data from the second scanning device and store the received scan data in the storage unit of the mobile terminal.

* * * * *